US012192083B1

(12) United States Patent
Cosgrove et al.

(10) Patent No.: US 12,192,083 B1
(45) Date of Patent: Jan. 7, 2025

(54) MONITORING NETWORK VOLATILITY (71) Applicant: CA, Inc., San Jose, CA (US)

(72) Inventors: David Cosgrove, Portsmouth, NH (US); John Murdough, Strafford, NH (US); Jason Normandin, Shrewsbury, MA (US); Tim Diep, Portsmouth, NH (US)

(73) Assignee: CA, Inc., San Jose, CA (US)

( * ) Notice: Subject to any disclaimer, the term of this patent is extended or adjusted under 35 U.S.C. 154(b) by 0 days.

(21) Appl. No.: 18/362,920

(22) Filed: Jul. 31, 2023

(51) Int. Cl.
*H04L 43/0817* (2022.01)
*H04L 43/045* (2022.01)
*H04L 43/062* (2022.01)

(52) U.S. Cl.
CPC ........ *H04L 43/0817* (2013.01); *H04L 43/045* (2013.01); *H04L 43/062* (2013.01)

(58) Field of Classification Search
CPC .. H04L 43/0817; H04L 43/045; H04L 43/062
See application file for complete search history.

(56) References Cited

U.S. PATENT DOCUMENTS

| 11,245,628 | B1* | 2/2022 | Smith | H04L 43/062 |
| 2014/0304395 | A1* | 10/2014 | Chandrayana | H04W 28/0231 709/224 |
| 2016/0171033 | A1* | 6/2016 | Konik | G06F 16/119 707/741 |
| 2019/0141113 | A1* | 5/2019 | Ganapathi | G06N 7/01 |
| 2021/0234769 | A1* | 7/2021 | Ganapathi | H04L 43/062 |
| 2022/0245013 | A1* | 8/2022 | Ciabarra, Jr. | G06F 11/3438 |
| 2024/0036767 | A1* | 2/2024 | Yang | G06F 3/0659 |

* cited by examiner

*Primary Examiner* — Michael Won
(74) *Attorney, Agent, or Firm* — King Intellectual Asset Management (57) ABSTRACT

Novel solutions for monitoring and analyzing networks in terms of the volatility of various devices. Some solutions consider a weighted set of metrics in determining such volatility. Evaluation of devices against peers in view of these factors can produce insight about network conditions.

20 Claims, 5 Drawing Sheets

MONITORING NETWORK VOLATILITY

TECHNICAL FIELD

This disclosure is directed generally to the field of computer networks, and more specifically, to network monitoring tools.

BACKGROUND

Volatility in a measured performance statistic (e.g., burstiness in interfaces) is difficult to predict, and current monitoring tools have a difficult time evaluating such volatility. The lack of consistency means that network architects and planners cannot accurately evaluate, predict and plan resource availability and performance. This leads to unpredictable performance and user experience for network transactions involving the volatile devices. For example, in a case where different devices experience vastly different data pattern while the average of each is similar, and no operational thresholds are breached, is often invisible to network monitoring tools and analysists.

Instead, current tools and techniques focus on identifying metrics that exceed operational thresholds using time-over-threshold windows, identifying abnormal performance as a result of baseline deviation, and identifying prolonged metric impacts which manifest as TopN performance outliers on a dashboard. These tools and techniques, on the other hand, have difficulty identifying short spikes/bursts that do not exceed time-over-threshold and do not generate events, Normalized deviations (consistent deviations that widen the "normal" baseline window preventing future deviations from being recognized and eliminating events), and short bursts that do not significantly impact overall TopN visibility, especially over longer reporting periods.

Hence, there is a need for new tools and techniques that can provide more robust network monitoring and analysis.

DETAILED DESCRIPTION

Some embodiments can leverage a combination of standard deviation and variance to identify volatility in specific devices. Some embodiments can provide a comparison across multiple devices in a group across multiple metrics of varying unit types, allowing cross-comparison of metrics, e.g., utilization as percentage value and errors as count or a rate (count over time). In accordance with various embodiments, measurements of volatility can be used to provide a dashboard and/or workflows to help identify volatile items and their causes/effects. These measurements, in some embodiments, can provide unconventional (outside the box) use cases with different metrics and weighting applicable to both the technology and its specific implementation in a given network. Additionally, and/or alternatively, some embodiments can provide a list and/or ranking of the most volatile devices in a specific group for specified time periods (one day, two days, etc.). Further embodiments can provide trend-able volatility measurements to help understand and predict change in the network.

One set of embodiments provides systems. A system in accordance with one set of embodiments can include one or more processors and logic, such as a non-transitory computer readable medium having encoded thereon a set of instructions executable by the processor. In some cases, the logic might be circuitry, such that the instructions are encoded into, and/or executed directly by the hardware/firmware circuitry.

The set of instructions might comprise instructions to receive a first plurality of data points. In an aspect, the plurality of data points can indicate measurements of a first metric in a computer network and a second metric in the computer network. In another aspect, the plurality of data points can include data points for a first device in the computer network and data points for a second device in the computer network. Metrics might be measured at any layer of the Open Systems Interconnection (OSI) model, and in particular embodiments, the metrics are measured at a layer below layer 4 of the OSI model. In some cases, the first metric is denominated with a first unit of measurement, the second unit is denominated with a first unit of measurement, and the first and second units of measurement are different.

In some embodiments, the device might be an interface, such as a LAN or WAN interface of a router; further examples of devices are described below. Accordingly, metrics can include, but are not limited to, a measure of incoming packet rate at an interface, outgoing packet rate at an interface, incoming utilization at an interface, outgoing utilization at an interface, incoming discards at an interface, outgoing discards at an interface, and/or errors at an interface. In some embodiments, the system can perform the monitoring functions event if the none of plurality of data points exceeds a time-over-threshold condition for the first metric or the second metrics and/or the plurality of data points indicates a normalized deviation of the first metric and/or the second metric.

In some embodiments, the set of instructions includes instructions to calculate, from at least some of the plurality of data points, a measure of volatility of the first metric for the first device and/or instructions to calculate, from at least some of the plurality of data points, a measure of volatility of the first metric for the second device. There might also be instructions to calculate, from at least some of the plurality of data points, a measure of volatility of the second metric for the first device and/or instructions to calculate, from at least some of the plurality of data points, a measure of volatility of the second metric for the second device.

Certain embodiments might include instructions to determine that the first device and the second device are peer devices, from among a plurality of devices in the peer network. This determination might include monitoring the first device and the second device, identifying one or more peer characteristics between the first and second devices, and/or classifying the first device and the second device as peer devices. Merely by way of example, these peer characteristics can include things like similar application traffic flows, similar networking arrangements with entities outside the computer network, one or more similar characteristics of a control plane of a software defined network (SDN), and/or the like.

The set of instructions can also include instructions to apply a first weighting factor to weight the measures of volatility of the first metric for the first device and the second device and/or instructions to apply a second weighting factor to weight the measures of volatility of the second metric for the first device and the second device. In turn, the instructions can include instructions to rank the first device and the second device according to the weighted measures of volatility of the first metric and the second metric for the first device and the second device.

In some embodiments, the set of instructions can include instructions to display, for a user, a list of the ranked first device and second device, the list showing the measures of volatility of the first metric and the second metric for each of the first device and the second device. In a particular set of embodiments, this can include displaying a dashboard display in a user interface. The dashboard display can comprise a group display comprising a plurality of network devices (including the first device and the second device) determined to be peer devices. The group display can the plurality of devices by rank and can include, for each of the plurality of devices, measures of volatility of the first metric and second metric.

In an aspect, embodiments can include instructions to rank a plurality of additional devices in addition to the first device and the second device according to the weighted measures of volatility of the first metric and the second metric for each of the plurality of additional devices. Embodiments might also include instructions to filter, from the list of ranked devices, a particular device, e.g., based on one or more characteristics that render the particular device unrepresentative of the list of ranked devices.

Certain embodiments include instructions to identify a network condition based on the weighted measures of volatility of the first metric and the second metric for the first device and the second device. In some cases, the network condition might include misconfiguration of an application at layer 7 of the OSI model. Some embodiments might include instructions to receive feedback about the identified network condition and/or instructions to update the first weighting factor and the second weighting factor based on the feedback.

Particular embodiments might include instructions to determine one or more actions to remedy the identified network condition. Such embodiments can also include instructions to display, for a user, a recommendation of one or more actions determined to remedy the identified network condition and/or instructions to implement one or more actions determined to remedy the identified network condition.

Another set of embodiments provides apparatus. One such apparatus can include a non-transitory computer readable medium having encoded thereon a set of instructions executable by one or more processors. The set of instructions might comprise one or more instructions such as those described above.

A further set of embodiments provides methods, including without limitation methods comprising operations performed by a computer system in accordance with the limitations above. Merely by way of example, a method in accordance with a set of embodiments can comprise receiving a first plurality of data points, the plurality of data points indicating measurements of a first metric in a computer network and a second metric in the computer network, the plurality of data points including data points for a first device in the computer network and data points for a second device in the computer network.

In some embodiments, the method further comprises calculating, from at least some of the plurality of data points, a measure of volatility of the first metric for the first device and/or calculating, from at least some of the plurality of data points, a measure of volatility of the first metric for the second device. The method might comprise calculating, from at least some of the plurality of data points, a measure of volatility of the second metric for the first device and/or calculating, from at least some of the plurality of data points, a measure of volatility of the second metric for the second device. In an aspect, the method can include applying a first weighting factor to weight the measures of volatility of the first metric for the first device and the second device and/or applying a second weighting factor to weight the measures of volatility of the second metric for the first device and the second device. In another aspect, the method can comprise ranking the first device and the second device according to the weighted measures of volatility of the first metric and the second metric for the first device and the second device, In some embodiments, the method includes displaying, for a user, a list of the ranked first device and second device, the list showing the measures of volatility of the first metric and the second metric for each of the first device and the second device.

EXEMPLARY EMBODIMENTS

Certain exemplary embodiments are described below. Each of the described embodiments can be implemented separately or in any combination, as would be appreciated by one skilled in the art. Thus, no single embodiment or combination of embodiments should be considered limiting.

Figure 1:
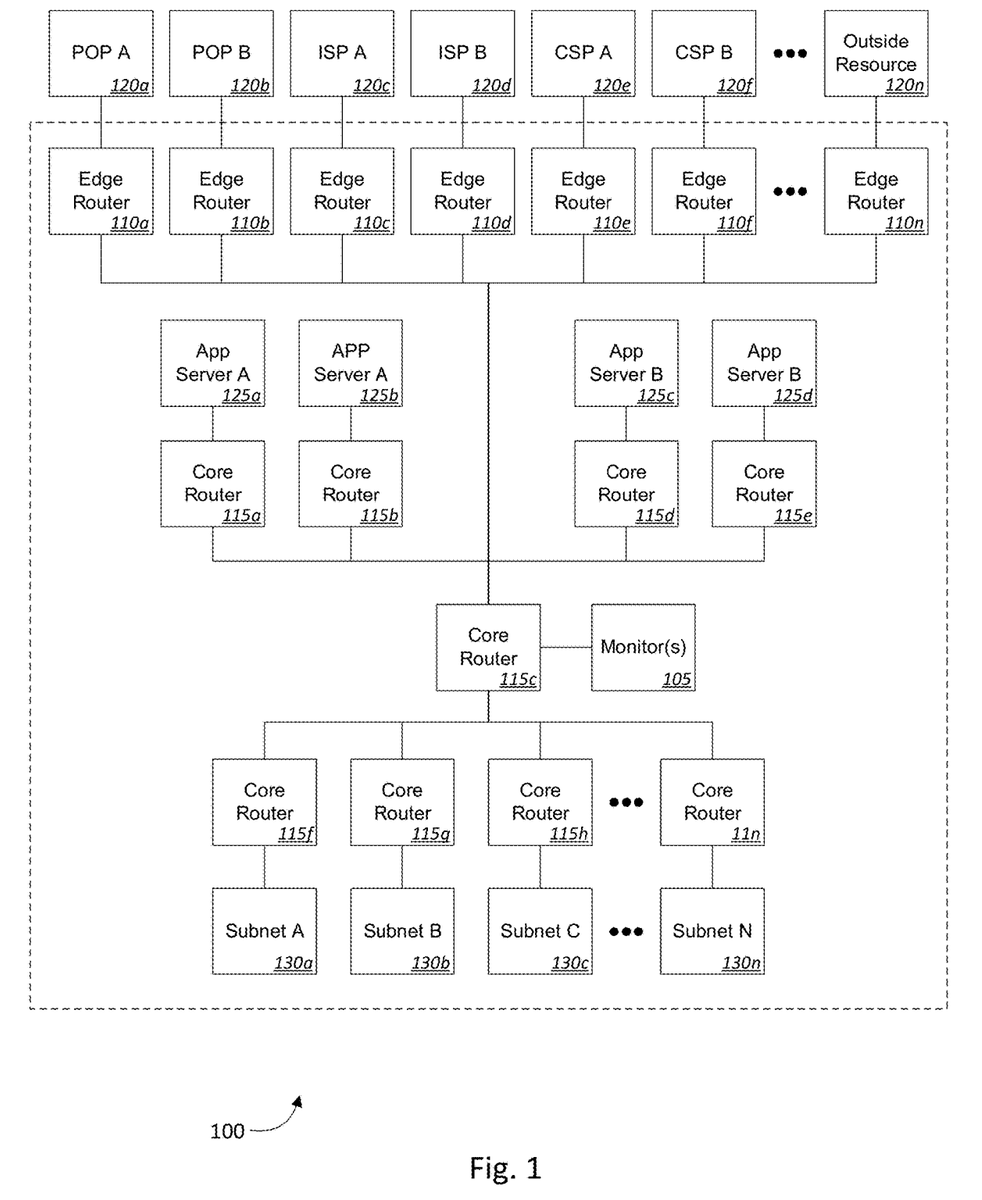
FIG. 1 is block diagram illustrating a network, in accordance with various embodiments.

FIG. 1 is block diagram illustrating a computer network 100 (also referred to as simply a "network"), in accordance with various embodiments. The network 100 might comprise one or more monitor computers 105, which individually and/or collectively can perform some or all of the operations described herein. In some embodiments, the monitor computer 105 might comprise a plurality of computers, either centralized or distributed throughout the network. Merely by way of example, in some embodiments, the monitor computer(s) 105 can operate to collect data points, analyze data points, transmit data points to a central monitoring area in computer 105, and or perform the methods and analysis described herein.

The network 100 might also comprise one or more networking devices, including without limitation, routers, switches, hubs, gateways, access points, and/or the like. All of these networking devices are examples of devices that can be monitored and from which data points can be collected. Alternatively, and or additionally, data points can be collected from various components of such devices, such as the components described below in the context of FIGS. 2A and 2B. Merely by way of example, but not limitation, the network 100, as illustrated, includes a plurality of edge routers 110 and a plurality of core routers 105. In some embodiments, the edge routers 110 can be connected with other devices within the network 100, such as core routers 115*c*. Additionally, edge routers 110 can be connected to one or more external resources 120. Such resources can include Internet points of presence 120*a*, 120*b*, internet service providers 120*c*, 120*d*, cloud service providers 120*e*, 120*f*, and any other type of outside resources 120.

Core routers 115 can provide connectivity between the edge routers 110 and other portions of the network 10. In addition, the core routers 115 might provide connectivity between one another and with resources internal to the network 100 really by way of example, core routers 11*a*, 115*b* can provide connection with application servers 125*a*, 125*b*, respectively, which might both serve the same application, such as a business application, a web conferencing application, a VoIP application, and or the like. Similarly core routers 115*d*, 115*e* can provide connectivity with application servers 125*c*, 125*d*, respectively, which can serve another type of application, such as any of those described above. The core routers 115 can also provide communication with other internal resources, such as subnetworks 135 and other types of internal resources.

Within the scope of various embodiments, network 100 can be any type of network or facility providing communication between multiple devices (which can include networking devices, servers, telecommunication devices, computers, etc.). In particular embodiments, the network 100 might be an enterprise network, a content delivery network, a cloud service provider network, an Internet service provider network, a private virtual network, a virtual local area network (LAN), and/or the like, to name a few examples. Thus, the depiction of network 100 in FIG. 1 merely provides a simplified overview for the purposes of illustration, and various embodiments can include many other types of networking devices and/or endpoint devices, such as end user computers, servers, mobile phones and tablets, VoIP phones, and/or the like. As described in further detail below, the monitoring computer(s) 105 can monitor the operation of various networking devices and other devices within the network, collect metric data on those devices, and/or analyze the volatility of a number of different metrics, based on that data. Based on this analysis, the monitoring computer(s) 105 can detect various network conditions, display analyzed data for operators, and/or perform other functions as described below. As used herein, the term "device" means any networking device or other machine operating on the network for which metrics can be measured, and/or various components of such a device, such as a processor, an interface, and/or the like, for which metrics can be measured.

Figure 2A:
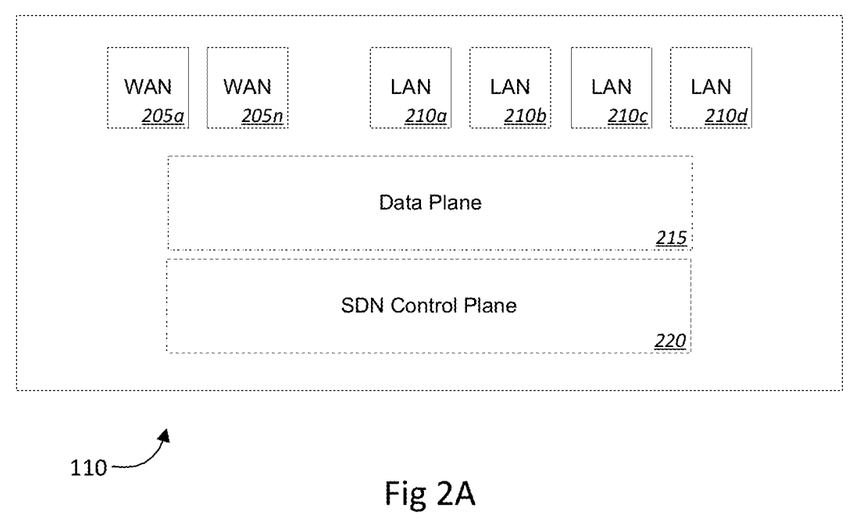
FIG. 2A is a block diagram illustrating an edge router, in accordance with various embodiments.
Figure 2B:
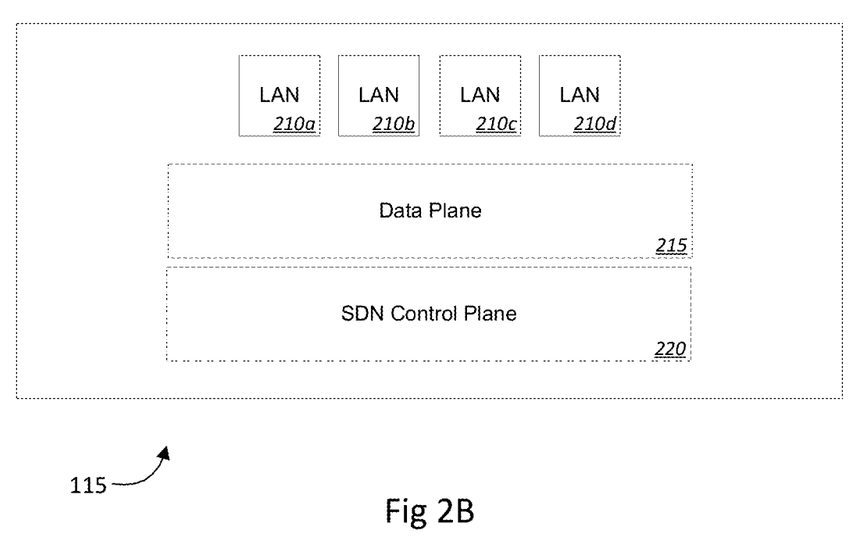
FIG. 2B is a block diagram illustrating a core router, in accordance with various embodiments.

For example, FIG. 2A is a block diagram illustrating an edge router 110, in accordance with various embodiments, while FIG. 2A illustrates a core router 115, in accordance with various embodiments. The edge router 110 of FIG. 2A comprises a plurality of interfaces 205, 210 (not all of which need be active at any given time). The router 110 itself can be a device in certain embodiments, as can each individual interface 205, 210 on the router 110. These interfaces can include wide one or more wide area network (WAN) interfaces 205 and one or more LAN interfaces 210. The term "interface" herein covers any component that provides connectivity between a device (such as a router, switch, computer, etc.) and the network 110 (or any network, such as a WAN). Merely by way of example, interfaces 205, 210 can include fiber optic interfaces, Ethernet interfaces, wireless (e.g., 5G, Wi-Fi) interfaces, and/or the like. The WAN interfaces can provide connectivity with resources 120 outside the network 100 of FIG. 1, while the LAN interfaces can provide connectivity with resources within the network 100 (e.g., application servers 120, other routers 110, 115, subnetworks 125, monitor computer(s) 105, switches, bridges, and the like). As illustrated by FIG. 1, the core routers 110 provide connectivity only within the network 100, so they comprise LAN interfaces 210 (although it is possible that the network 100 itself includes a WAN, in which case the core routers 110 might have WAN interfaces (not shown) to enable intra-network wide area communications).

As discussed in more detail below, some embodiments of the invention employ the concept of "peer" devices to analyze metric volatility. Generally, this concept recognizes that comparing two (or more) devices that are peers can produce more actionable insight than comparing devices that are not peers. As discussed below, various embodiments can employ strategies to determine which devices should be considered peers. But at a very high level, peer devices can share one or more common characteristics that non-peer devices do not. One example is that the difference in roles between two devices might provide some indication that those devices should not be considered peers.

Merely by way of example, comparing volatility of a dropped packets metric for a router and for a switch (all other things being equal) might not provide tremendous insight, simply because of the significantly different roles these two devices play in the network. Routers, operating at layer 3 of the OSI stack, generally route between different networks or subnetworks using route tables of IP addresses, while (traditional) switches operate at layer 2 and forward packets by port based on MAC addresses.

Similarly, while all of the routers 110 and 115 are routers, the edge routers 110 and core routers 115 can serve different roles in the network. As shown by FIG. 1, edge routers 110 might handle traffic passing into and out of the network 100, while the core routers 115 might handle traffic only within the network 100. Given the different roles, disparities between the volatility of metrics for an edge router 110 and a core router 115 might not provide as much insight as difference as the volatility of two edge routers 110. Thus, the role of a router (or other device)—at any level of granularity—can be considered a characteristic of that device in some embodiments.

As another example, at a more granular level, an edge router 110*a* connected to a POP 120*a* might have more in common (all other things being equal) with another edge router 110*b* connected to another POP 120*b* than an edge router 110*c* connected to an ISP 120*c* or an edge router 110*d* connected to a CSP 120*d*. Similarly, the WAN interface 205 on a given router 110*a* might be more likely to be a peer of a WAN interface 205 on another router 110*b* than a peer of a LAN interface 210 on the same router 110*a*. Thus, the nature of the respective connections maintained by devices (and, in particular, routers and their interfaces) can be considered characteristics of those devices.

Thus, two edge routers 120 connected to the same CSP might can have that characteristic in common and might thus be considered peers (in view of this characteristic alone or in combination with other characteristics). Likewise, core routers 115*a*, 115*b* providing connectivity to two application servers 125*a*, 125*b* serving the same application (or, in some cases, the same type of application) might have that characteristic in common and thus might be more likely to be peers with each other than a core router 115*d* providing connectivity to a server 125*c* serving a different application. And router 115*d* might be more likely to a peer of router 115*e*, both connecting with servers 125*c*, 125*d* serving the same application, than of routers 115*a*, 115*b*. Further, all of these core routers might be more likely to be peers of each other than of a core router 115*f* providing connectivity to a subnetwork 120*a*, because the former all handle application traffic directly from or to an application server 125, whereas the latter handles traffic between the subnetwork 130*a* and the rest of network 100; this traffic might have different characteristics (e.g., a lower proportion of application traffic) from the traffic normally carried by routers 115a, 115b, 115d, 115e. From this example, it can be appreciated that the role of a device can have an effect on its characteristics, and therefore on which devices might be likely to be its peers. Moreover, the characteristics can be similar by degree-some embodiments do not require a binary decision on similarity of characteristics—as the example above demonstrates: routers 115a and 115b are most similar (in terms of the type of application traffic they handle) while 115a and 15c might share fewer characteristics in common, and 125a and 125f might share fewer still characteristics in common.

But the role of a device is far from the only characteristic that can be considered. Various embodiments can consider any number of characteristics of devices. In general, a "characteristic," as that term is used herein, can include any variable related to a device that might affect the functioning or performance of that device, all other things being equal.

For example, in some embodiments, the data plane 215 of each router 110, 115 (which handles the forwarding of packets and the mechanics of operating the network) is separated from the control plane 220, and/or the control plane 220 might be configured using a software-defined network. In particular embodiments, two routers (whether in similar roles or different roles) with similarly configured control planes (which might dictate, inter alia, how the routers make traffic optimization decisions) might share enough characteristics to be considered peers. On the other hand, two similar routers with different traffic optimization settings might behave quite differently under normal conditions and those settings, therefore, can be considered characteristics of the routers. As another example, two devices controlled by the same brand of SDN software might share more characteristics than two devices controlled by different brands of SDN software.

In other cases, the various layers of the OSI stack can reveal many device characteristics, including PHY (Layer 1) characteristics (e.g., fiber vs. 1000Base-T vs. 100Base-T vs Wi-Fi, etc.), Layer 2 characteristics (e.g., virtual LAN (VLAN) configuration, spanning tree protocol configuration, etc.), Layer 3 characteristics (e.g., routing protocols and configuration, packet inspection configuration, etc.), and the like. For example, the route tables of routers can provide insight into whether a particular interface is a WAN interface, and the depth of a table can also be considered a characteristic for comparison. Other characteristics can include things like packet flow through a device, application traffic through a device, device make and model, type of connectivity, geographic and/or logical location, business services delivered, applicable service level agreements (SLA), and the like. From these examples, it should be appreciated that, within the scope of various embodiments, many other characteristics can be considered as well when determining whether any two devices might be peers.

Figure 3:
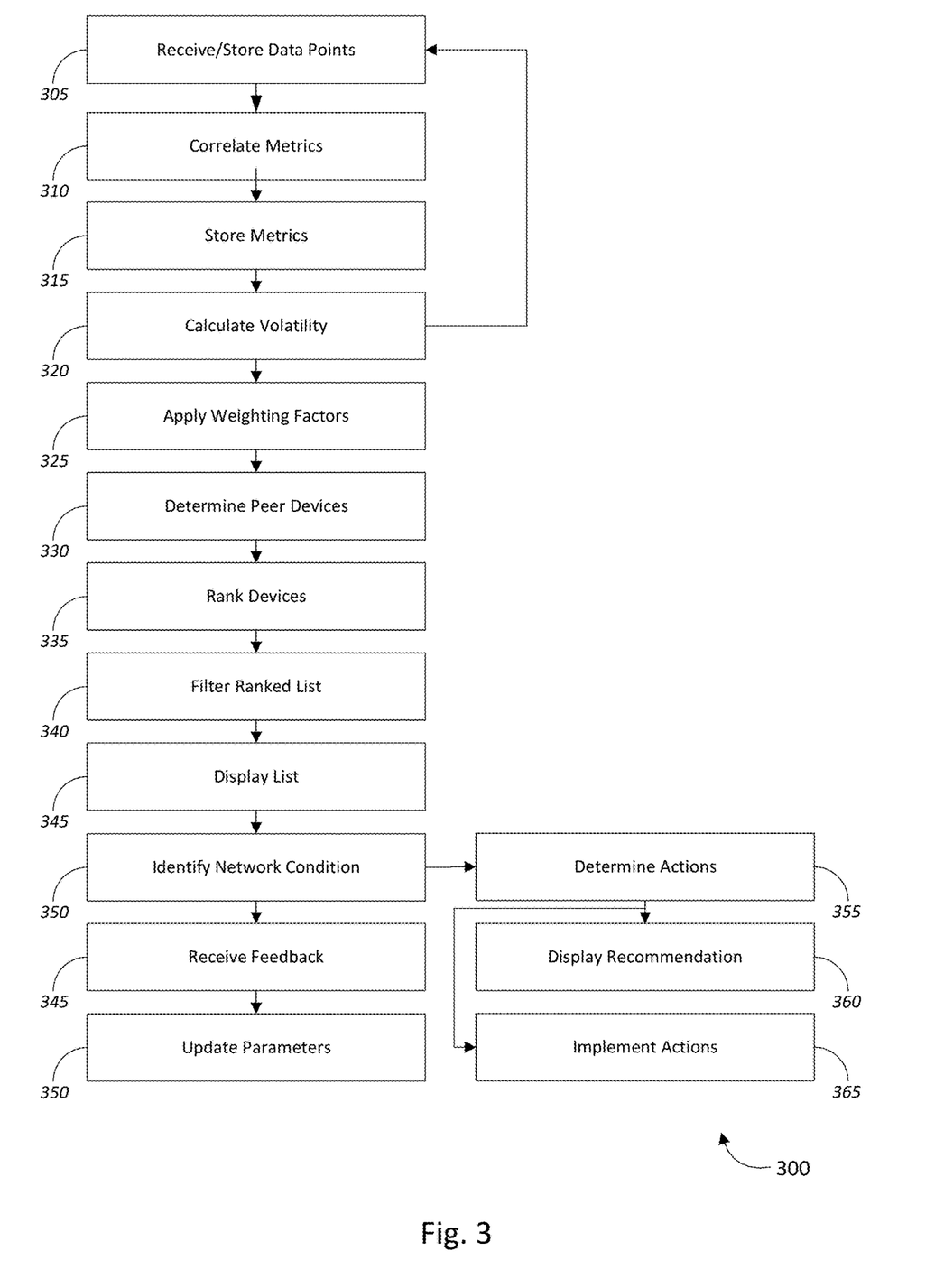
FIG. 3 is a flow diagram illustrating a method of network monitoring, in accordance with some embodiments.

FIG. 3. Illustrates a method of measuring network volatility in accordance with some embodiments. The method 300 comprises receiving a plurality of data points (block 305). A data point can be any datum or data that provides information about (e.g., measurements of) one or more metrics to be analyzed as described herein. In some embodiments, the data point might include information identifying the metric measured, the devices it was measured from, etc., but this is not always required. Collectively, these data points can reflect the measurement of several different metrics across many different devices. As used herein, the term "metric" means ay statistic or operating parameter that can be measured and/or can indicate a performance level or operability of a device, with particular regard to network performance or operability. There are many examples of metrics, which can include, without limitation data about throughput (incoming and/or outgoing packets, collectively or individually), dropped packets, discarded packets, interface utilization (including incoming packets and/or outgoing packets, together or separately), errors (including incoming packets and/or outgoing packets, together or separately), latency, congestion. processor utilization, temperature, and the like.

Metrics can be measured at any appropriate layer of the OSI model. In many cases, metrics are measured at layers 1-3 of the model. Metrics also can be denominated using many different units of measurement. As noted below, evaluating the volatility of the metrics, rather than merely the raw data itself, can provide a normalization that eliminates disparities in units of measurement. This can allow comparison and analysis of different metrics having different units of measure.

At block 310, the method comprises correlating metrics with devices based on the data points. Merely by way of example, each data point might include not only metric information (e.g., a number of packets discarded over a period of time) but also additional information, such as a time window over which the measurement was taken, an identifier (e.g., IP address, MAC address, etc.) of the device from which the measurement was taken, and/or the like. From this information, a metric and the device from which the metric was taken can be identified and correlated. The correlated metrics can then be stored (block 315), for example in one or more database tables or using any other suitable data structure. An exemplary table might include columns for a timestamp of the metric, an identifier of the metric (e.g., packets discarded), the metric itself (e.g., 10 packets discarded/second), and an identifier of the device (which may be the IP/MAC address or may be a name assigned in the monitoring system to that device, etc.).

The method 300 can further comprise calculating measures of volatility of one or more metrics for one or more devices (block 320). A measure of volatility can be any value that indicates the relative level of variability of a metric over time. Merely by way of example, one measure of volatility of a metric is the coefficient of variation, which is defined as follows:

$$c_v = \frac{\sigma}{\mu} \qquad (1)$$

where $c_v$ is the coefficient of variation of the metric, $\sigma$ is the standard deviation of the metric, and $\mu$ is the mean of the metric. In some cases, a measure of volatility can very useful in this context if it is a dimensionless value, such as the coefficient of variation. This means it can be used to compare metrics that have different dimensions (or units of measure). Merely by way of example, latency is normally measured as a unit of time, while incoming packets are measured as a rate (e.g., packets/second), which makes direct comparison of those values difficult. Using the coefficient of variation (or another dimensionless measure of volatility) for each metric, however, allows direct comparison of those metrics. Moreover, as noted above, analyzing the volatility of a metric can reveal insights that might not be apparent from the raw metric data itself. In some cases, the measure of volatility can be stored for each metric and/or device. Moreover, as additional data points are received, the operations of blocks 305-320 can be repeated, with the measure of volatility for each metric-device pair being updated as more data is received.

At some point, older data points may be aged out of the volatility calculation, either by function of an automated rule (e.g., data points more than a month old are no longer considered in calculating volatility) or by a trigger, such as input from an operator, detection of a change in configuration of the device or some other network component that would affect the metric, etc. Conversely, volatility can be calculated using different windows of time, which allows the comparison of volatility of a metric for the same device over different periods, which can also reveal insights about network operation.

At block 325, the method 300 comprises applying weighting factors to each of the metrics. Weighting factors can include any values that express the relative weight or emphasis to be given to different metrics for purpose of analysis. Merely by way of example, one weighting scheme would be to apply values to each metric, with the total of those values being 1.0. Thus, for example, in a particular scenario, packet discards might be weighted at 0.25, packet drops might be weighted at 0.15, errors might be weighted at 0.10, incoming utilization might be measured at 0.25, and outgoing utilization might be weighted at 0.25, for a total of 1.0. Other collected metrics might be weighted at 0.0 (i.e., disregarded) and/or omitted from the analysis altogether. The selection of the weighting factor to be applied to each metric can be based on many factors. For example, domain expertise can be used to set initial weighting factors, which might be updated (as described below, for example) over time as more data points are collected and analyzed. In an aspect, weighting factors can reflect how the relative predictive or diagnostic value of each particular metric with regard to specific network conditions. More generally, analysis of different network conditions might weight the same metrics differently and/or might use different metrics.

Figure 4:
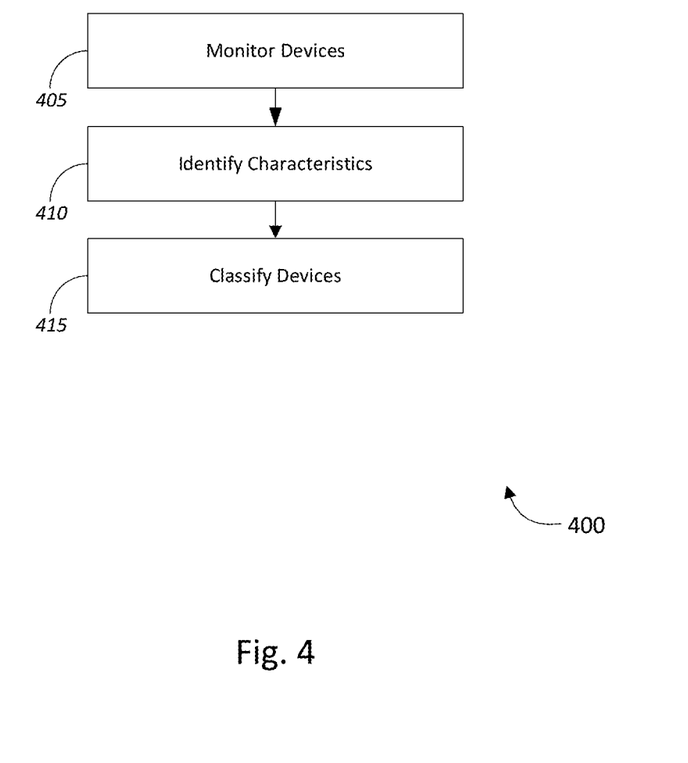
FIG. 4 is a flow diagram illustrating a method of identifying peer devices, in accordance with some embodiments.

The method 300 might further comprise determining that two or more devices are peer devices (block 330). As noted above, comparison of peer devices can provide more insight than comparison of dissimilar devices. There are many ways of determining that devices are peer devices. For example, FIG. 4 illustrates one method 400 of determining whether devices are peer devices, in accordance with some embodiments.

The method 400 can include monitoring one or more devices (block 405). In some embodiments monitoring can include interrogation of devices to identify various characteristics of the devices, including without limitation characteristics such as those described above.

The method 400 can also include identifying peer characteristics between or among the devices (block 410). The term "peer characteristics," as used herein, means any characteristics that are selected for evaluation to determine whether different devices should be classified as peers. At a high level, the nature of the device (bridge, switch, router, interface, etc.) and its physical and/or logical location in the network are characteristics of that device. Many other examples of characteristics are discussed above. In some embodiments, the selection of peer characteristics can depend, at least in part, on the type of analysis to be performed.

In some cases, there may be no filter for peer characteristics, and identifying peer characteristics might simply comprise identifying, for comparison, all characteristics about a set of devices that the monitoring and/or interrogation will produce. In other cases, certain characteristics might be of more interest than others, and those characteristics of greater interest can be identified as peer characteristics. Merely by way of example, the type of device might be of primary interest, on the basis that comparing metrics for two completely different devices (e.g., an unmanaged switch and an interface of an edge router) might not produce very actionable analysis. In other cases, a particular part of the network might be of concern, so the location (logical and/or physical) of devices might be of interest, in order to exclude devices outside the part of network being analyzed.

More generally, monitoring for different network conditions might change the relative importance of different characteristics, and those can be identified as peer characteristics (i.e., characteristics of interest in determining whether devices are peers for purposes of that monitoring). For example, if there is a concern about a network condition that involves primarily WAN traffic, it might be of primary interest whether a router has a WAN interface, and if so, the outside resource to which that interface is connected. In that case, those two characteristics might be identified as peer characteristics, and all others might be disregarded. As another example, if an application seems to be causing network issues, the peer characteristic might be devices that communicate with application servers serving that application.

At block 415, the method 400 can include classifying two or more devices as peer devices. Classifying two or more devices as peers can involve any operation(s) that determine that two or more devices are similar enough to provide a more actionable comparison than if the devices were not peers. This classification can involve evaluating the identified peer characteristics to determine degrees of similarity and difference and dividing a group of devices into two or more subgroups, in which all of the devices in a subgroup are classified as peers. A number of techniques can be used to perform the classification. For example, if there is only one peer characteristic and it is binary (e.g., the device either is or is not a WAN interface), the classification can be a binary operation-if the peer characteristic matches, the devices are peers. In more complex situations, the technique might be more involved. For example, if there are three identified peer characteristics, then two devices might have to share all three in common (i.e., both devices are a WAN interfaces; both devices have a connection with the same cloud service provider, and both devices are managed by the same brand of SDN). In some cases, perhaps only two of the three characteristics might need to match. In particular embodiments, the characteristics might be weighted in classifying peer devices, similar to how metrics can be weighted, as described above, for example.

Returning to FIG. 3, the method 300 might include ranking the devices. Ranking a device can comprise any operations that order, prioritize, or otherwise distinguish between a plurality of devices on a numerical basis. In some cases, devices can be ranked based on measured variability, for example, according to the sum of the weighted measurements of volatility of their metrics. Returning to the weighting example above, the ranking might comprise the following operations: (1) for each device, add (the measure of volatility of packet discards 5 0.25)+(the measure of volatility of packet drops 5 0.15)+(the measure of volatility of errors 5 0.10)+(the measure of volatility of incoming utilization 5 0.25)+(the measure of volatility outgoing utilization 5 0.25) to arrive at a total weighted measure of volatility; (2) order the devices (e.g., from highest to lowest) by total weighted measure of volatility of each device. If the devices had been classified into peer groups, the ranking might be performed for all peer groups, for only some of the peer groups, or even for a single peer group (for instance, to compare the volatility of one particular device with those of its peers). Each peer group might have its own ranked list of devices.

Further, In some embodiments, the ranked list can be filtered, e.g., to remove from the list devices that might not be appropriate for inclusion in the list (block 340). Filtering can comprise any operation that discriminates between reliable data and unreliable data, or more generally, between data to be used for analysis and data not to be used for analysis in a particular situation. For example, a particular device might be filtered from the list based on one or more characteristics that render the particular device unrepresentative of the list of ranked devices (in an embodiment without peer classification, for example). In other cases, the measure of volatility of one or more metrics for a device might be such so dissimilar from other devices as to render that device unsuitable for the ranking (for example, if a device had so few packet drops that the mean packet drops were close to zero, thereby driving a coefficient of variation too high to be of realistic value). Different embodiments might employ a variety of reasons for filtering devices from the ranked list.

At block 345, the illustrated method 300 includes displaying data, such as a ranked list of devices, for a user. In a particular set of embodiments, displaying the ranked list can include displaying a dashboard display in a user interface. In some embodiments, a dashboard display can comprise any user interface that includes a plurality of panels showing different information. Various panels can display a variety of different tools for analysis. For example, one panel of the dashboard display might comprise one ranked list of devices. Other panels might show more specific information about one or more (e.g., the top 1, 2, 3, etc.) of the ranked devices. Still other panels might show a list of network conditions, and an operator could select one of network conditions from the list, to change the display of the first panel to a ranked list of devices related to that network condition. Likewise, the ranked list of the first panel might display, for each of the metrics analyzed, the measure of volatility for that metric, and the operator might have the ability to select a column heading to re-sort the list according to that particular metric. Likewise, the operator might have the ability to drill into a particular device to see more metrics (expressed as raw data of each metric and/or as a measure of the volatility of each metric, for example, but causing such details to be displayed in a different panel.

In some cases, the method 300 includes identifying a network condition (block 350), e.g., based on the weighted measures of volatility of one or more metrics for various monitored devices (and, in particular instance, peer devices). In some embodiments, this identification can include reporting, displaying, notifying another entity of, or otherwise providing an indication of, the network condition. A network condition can be any current, past, and/or anticipated future situation, configuration, performance, or service level, etc., involving the network, any portion(s) of the network, or any device(s) in the network. In some cases, a network condition might involve and/or indicate suboptimal, unexpected, and/or unacceptable performance of the network, a portion thereof, or one or more devices therein. In some embodiments, network conditions can occur at or involve one or more layers of the OSI stack. In some cases, a routing failure (layer 3) might constitute a network condition. In other cases, an underperforming or misconfigured application (layer 7) might constitute a network.

In many cases, a network condition cannot be detected easily from the metrics themselves. Merely by way of example, many monitoring systems to not flag a metric as problematic unless the metric attains or exceeds a time-over-threshold condition. (A time-over-threshold condition is any condition in which data points indicate values of a metric which fail to satisfy a threshold established for the metric for an established period of time.). In such a case, the volatility of the metric can provide indication of a problem that cannot be seen by analysis of the raw metric alone. Similarly, some networks can result in a normalized deviation of a metric. This condition also avoids detection through analysis of the raw metric data.

In still other cases, a single volatile metric might not itself indicate an alarming network condition, but volatility in multiple metrics (which might be weighted for analysis, as noted above) can indicate a problem, especially when compared with weighted values for peer devices. In some cases, a view of multiple devices, ranked by weighted volatility can indicate a problem that is not even attributable to the network devices themselves. For example, a misconfiguration of an application (e.g., at layer 7), such as a web application, VoIP application or any other application that generates of affects network traffic, might result in unusual volatility in the metrics of a nearby device, which themselves might not indicate such a misconfiguration when examined directly; such a condition perhaps can be diagnosed by comparing that device to other peer devices; if the nearby device is ranked significantly ahead of peer devices in overall volatility and no other metrics indicate underlying metric conditions, the configuration of that application can be investigated.

In some cases, the method 300 includes, at block 355, receiving feedback about the identified network condition. Feedback can include, without limitation, any input to the process (and/or a machine that executes the process, etc.) that conveys any information about the network condition and/or any actions taken to address the network condition. Such feedback might be received from a human operator and/or from an automated process. Merely by way of example, after the identified network condition has been investigated, the monitoring system might receive feedback indicating whether the selected metrics and/or weighting factors had predictive and/or diagnostic value, such as, for example, whether the diagnosed condition actually exists (or existed when diagnosed). Based on that feedback, the system might adjust different parameters in its algorithm (block 360), such as the weighting factors for selected metrics, the selection of the metrics themselves, the device characteristics chosen for peer classification, and/or the like.

In particular embodiments, the method 300 can include determining one or more actions that could remedy or ameliorate the identified network condition (block 365). Such actions can include, without limitation, any configuration, rearrangement, adjustment, addition, subtraction, etc. of devices, applications, or other entities in the network and might include actions performed by a computer and/or by a human. For instance, the system might conclude that an application is misconfigured based on evaluation of the weighted volatility of the metrics analyzed, the ranked list of devices, and/or the like. Based on that conclusion, the system might recommend one or more actions, such as further investigation of the application, specific parameters for reconfiguring the application, and/or the like. In other cases, the system might recommend changing configurations of one or more layer 1-3 parameters, such as changing routing optimizations, control plane parameters, brands of SDN software, and/or the like.

In some embodiments, these actions can be displayed for a user (block 370), e.g., with a recommendation to perform one or more of the actions to remedy or ameliorate the identified network condition and/or guidance on how such actions should be performed. Depending on the situation, the system itself may be able to implement such actions (block 375), for example with API access to SDN software, control plane functions, and/or the like.

Figure 5:
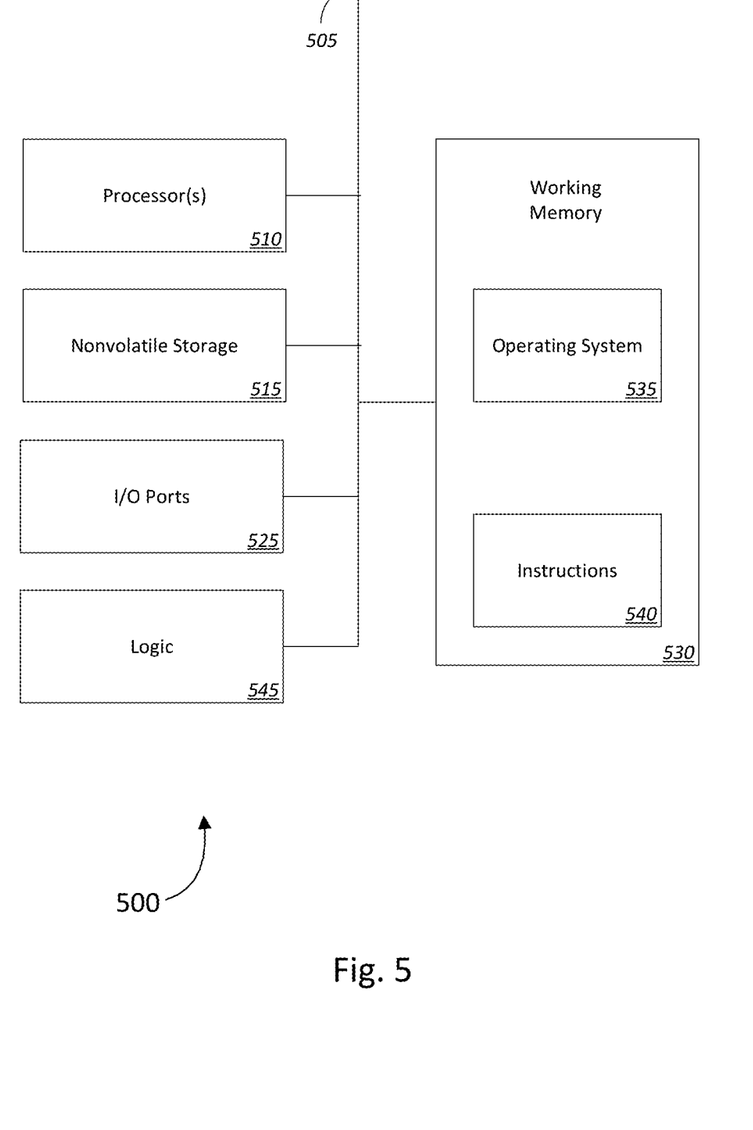
FIG. 5 is a block diagram illustrating example components of a computer system in accordance with some embodiments.

FIG. 5 is a block diagram illustrating an example of a device 500, which can function as described herein, including without limitation serving as a network device or other device, a monitoring system, and/or the like, in accordance with various embodiments, and/or perform some or all operations of the methods described herein. It should be noted no component shown in FIG. 5 should be considered necessary or required by each embodiment. For example, devices (e.g., switches) in many embodiments may not include a processor and/or might be implemented entirely in hardware or firmware circuitry. Similarly, many embodiments may not include input devices, output devices, and/or network interfaces.

With that prelude, as shown in FIG. 5, the device 500 may include a bus 505. The bus 505 includes one or more components that enable wired and/or wireless communication among the components of the device 500. The bus 505 may couple together two or more components of FIG. 5, such as via operative coupling, communicative coupling, electronic coupling, and/or electric coupling.

The device 500 can also include a processor 510, which can include a central processing unit, a graphics processing unit, a microprocessor, a controller, a microcontroller, a digital signal processor (DSP), programmable logic (such as a field-programmable gate array (FPGA) an erasable programmable logic device (EPLD), or the like), an application-specific integrated circuit (ASIC), a system on a chip (SoC) and/or another type of processing component. The processor 510 can be implemented in hardware, firmware, or a combination of hardware, firmware and/or software. In some implementations, the processor 510 includes one or more processors capable of being programmed to perform one or more operations or processes described elsewhere herein. For example, the device 500 can include nonvolatile storage 515 for instructions (e.g., operating system, applications, object code, assembly, binary, etc.) used to program the processor 510 in this way. In some cases, the storage can be a hard disk drive in accordance with various embodiments. This storage 515 can be a nonvolatile memory, hard disk drive, etc. that stores the instructions. In a particular set of embodiments, the instructions are stored as hardware instructions, for example as encoded in hardware and/or firmware (e.g., hardware circuitry 550, discussed below).

In some embodiments, the device 500 might include input components 520 and/or output components 525. The input components 520 can enable the device 500 to receive input, such as user input and/or sensed input. For example, the input component 520 may include a touch screen, a keyboard, a keypad, a mouse, a button, a microphone, a switch, a sensor, a global positioning system sensor, an accelerometer, a gyroscope, and/or an actuator. The output component 525 can enable the device 500 to provide output, such as via a display, a speaker, and/or a light-emitting diode.

The device 500 can also include a communication interface 530, which can enable the device 500 to communicate with other devices via a wired (electrical and/or optical) connection and/or a wireless connection. For example, the communication interface 560 may include a receiver, a transmitter, a transceiver, a modem, a network interface card, and/or an antenna. In some cases, the communication interface 530 might comprise a plurality of I/O ports, each of which can be any facility that provides communication between the device 500 and other devices, in particular embodiments, such ports can network ports, such as Ethernet ports, fiber ports, etc. Other embodiments can include different types of I/O ports, such as serial ports, pinouts, and/or the like.

In some embodiments, the device 500 can comprise logic. Such logic can be any sort of code, instructions, circuitry, or the like that can cause the device 500 to operate in accordance with the embodiments herein (e.g., to perform some or all of the processes and/or operations described herein). Merely by way of example, the device 500 can include a working memory 535, into which can be loaded (e.g., from storage 515) an operating system 540 and/or other instructions 545. (e.g., to perform the operations and methods described herein). In some implementations, execution of the instructions 545, by one or more processors 510, causes the one or more processors 510 and/or the device 500 to perform such operations.

Alternatively, and/or additionally, logic can include circuitry 550 (e.g., hardware or firmware), which can operate independently of, or collaboratively with, any processor 510 the device 500 might or might not have. (As noted above, in some cases, the circuitry 550 itself can be considered a processor 510.) In such cases, some or all of the logic enabling or causing the performance of some or all of the operations described herein might be encoded in hardware or firmware circuitry (e.g., circuitry 550) and executed directly by such circuitry, rather than being software loaded into working memory 535. Thus, unless the context dictates otherwise, embodiments described herein are not limited to any specific combination of hardware, firmware, and/or software.

CONCLUSION

In the foregoing description, for the purposes of explanation, numerous details are set forth to provide a thorough understanding of the described embodiments. It will be apparent to one skilled in the art, however, that other embodiments may be practiced without some of these details. In other instances, structures and devices are shown in block diagram form without full detail for the sake of clarity. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Thus, the foregoing description provides illustration and description of some features and aspect of various embodiments, but it is not intended to be exhaustive or to limit the implementations to the precise form disclosed. One skilled in the art will recognize that modifications may be made in light of the above disclosure or may be acquired from practice of the implementations, all of which can fall within the scope of various embodiments. For example, as noted above, the methods and processes described herein may be implemented using software components, firmware and/or hardware components, (including without limitation processors, other hardware circuitry, custom integrated circuits (ICs), programmable logic, etc.) and/or any combination thereof.

Further, while various methods and processes described herein may be described with respect to particular structural and/or functional components for ease of description, methods provided by various embodiments are not limited to any particular structural and/or functional architecture but instead can be implemented in any suitable hardware configuration. Similarly, while some functionality is ascribed to one or more system components, unless the context dictates otherwise, this functionality can be distributed among various other system components in accordance with the several embodiments.

Likewise, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with or without some features for ease of description and to illustrate aspects of those embodiments, the various components and/or features described herein with respect to a particular embodiment can be substituted, added and/or subtracted from among other described embodiments, unless the context dictates otherwise.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods does not limit the implementations unless specifically recited in the claims below. Thus, when the operation and behavior of the systems and/or methods are described herein without reference to specific software code, one skilled in the art would understand that software and hardware can be used to implement the systems and/or methods based on the description herein.

In this disclosure, when an element is referred to herein as being "connected" or "coupled" to another element, it is to be understood that one element can be directly connected to the other element or have intervening elements present between the elements. In contrast, when an element is referred to as being "directly connected" or "directly coupled" to another element, it should be understood that no intervening elements are present in the "direct" connection between the elements. However, the existence of a direct connection does not preclude other connections, in which intervening elements may be present. Similarly, while the methods and processes described herein may be described in a particular order for ease of description, it should be understood that, unless the context dictates otherwise, intervening processes may take place before and/or after any portion of the described process, and, as noted above, described procedures may be reordered, added, and/or omitted in accordance with various embodiments.

In this application, the use of the singular includes the plural unless specifically stated otherwise, and use of the term "and" means "and/or" unless otherwise indicated. Also, as used herein, the term "or" is intended to be inclusive when used in a series and also may be used interchangeably with "and/or," unless explicitly stated otherwise (e.g., if used in combination with "either" or "only one of"). Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise. As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

Unless otherwise indicated, all numbers used herein to express quantities, dimensions, and so forth should be understood as being modified in all instances by the term "about." As used herein, the articles "a" and "an" are intended to include one or more items and may be used interchangeably with "one or more." Similarly, as used herein, the article "the" is intended to include one or more items referenced in connection with the article "the" and may be used interchangeably with "the one or more." As used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. In the foregoing description, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Thus, while each dependent claim listed below may directly depend on only one claim, the disclosure of various implementations includes each dependent claim in combination with every other claim in the claim set. No element, act, or instruction used herein should be construed as critical or essential unless explicitly described as such.

The invention claimed is:
1. A system, comprising:
one or more processors; and
a non-transitory computer readable medium having encoded thereon a set of instructions executable by the one or more processors, the set of instructions comprising:

instructions to receive a first plurality of data points, the plurality of data points indicating measurements of a first metric in a computer network and a second metric in the computer network, the plurality of data points including data points for a first device in the computer network and data points for a second device in the computer network;
instructions to calculate, from at least some of the plurality of data points, a measure of volatility of the first metric for the first device;
instructions to calculate, from at least some of the plurality of data points, a measure of volatility of the first metric for the second device;
instructions to calculate, from at least some of the plurality of data points, a measure of volatility of the second metric for the first device;
instructions to calculate, from at least some of the plurality of data points, a measure of volatility of the second metric for the second device;
instructions to apply a first weighting factor to weight the measures of volatility of the first metric for the first device and the second device;
instructions to apply a second weighting factor to weight the measures of volatility of the second metric for the first device and the second device;
instructions to rank the first device and the second device according to the weighted measures of volatility of the first metric and the second metric for the first device and the second device; and
instructions to display, for a user, a list of the ranked first device and second device, the list showing the measures of volatility of the first metric and the second metric for each of the first device and the second device.

2. The system of claim 1, wherein the measures of volatility are coefficients of variation.

3. The system of claim 1, wherein set of instructions further comprises:
instructions to identify a network condition based on the weighted measures of volatility of the first metric and the second metric for the first device and the second device.

4. The system of claim 3, wherein the metric is measured at a layer below layer 4 of the Open Systems Interconnection (OSI) model, and wherein the identified network condition occurs above layer 5 of the OSI model.

5. The system of claim 4, wherein the identified network condition is a misconfiguration of an application at layer 7 of the OSI model.

6. The system of claim 3, wherein the set of instructions further comprises:
instructions to determine one or more actions to remedy the identified network condition; and
instructions to display, for a user, a recommendation one or more actions determined to remedy the identified network condition; or
instructions to implement one or more actions determined to remedy the identified network condition.

7. The system of claim 1, wherein the first device is a first network interface, and the second device is a second network interface.

8. The system of claim 1, wherein the set of instructions further comprises:
instructions to determine that the first device and the second device are peer devices from among a plurality of devices in the peer network.

9. The system of claim 8, wherein determining that the first device and the second device are peer devices comprises:
monitoring the first device and the second device;
identifying one or more peer characteristics between the first and second devices; and
classifying the first device and the second device as peer devices.

10. The system of claim 9, wherein the one or more similar peer characteristics comprise similar application traffic flows.

11. The system of claim 9, wherein the one or more peer characteristics comprise similar networking arrangements with entities outside the computer network.

12. The system of claim 9, wherein the one or more peer characteristics comprises one or more similar characteristics of a control plane of a software defined network (SDN).

13. The system of claim 8, wherein displaying a list of the ranked first device and second device comprises displaying a dashboard display in a user interface, the dashboard display comprising a group display comprising a plurality of network devices determined to be peer devices, the plurality including the first device and the second device, the group display listing the plurality of devices by rank, the listing including, for each of the plurality of devices, measures of volatility of the first metric and second metric.

14. The system of claim 1, wherein:
the first metric is denominated with a first unit of measurement;
the second unit is denominated with a first unit of measurement; and
the first and second units of measurement are different.

15. The system of claim 1, wherein the first metric comprises a measure of one or more of incoming packet rate at an interface, outgoing packet rate at an interface, incoming utilization at an interface, outgoing utilization at an interface, incoming discards at an interface, outgoing discards at an interface, or errors at an interface.

16. The system of claim 1, wherein none of the plurality of data points exceeds a time-over-threshold condition for the first metric or the second metric, or the plurality of data points indicates a normalized deviation of the first metric or the second metric.

17. The system of claim 1, wherein the set of instructions further comprises:
instructions to receive feedback about the identified network condition;
instructions to update the first weighting factor and the second weighting factor based on the feedback.

18. The system of claim 1, wherein the set of instructions further comprises:
instructions to rank a plurality of additional devices in addition to the first device and the second device according to the weighted measures of volatility of the first metric and the second metric for each of the plurality of additional devices; and
instructions to filter, from the list of ranked devices, a particular device based on one or more characteristics that render the particular device unrepresentative of the list of ranked devices.

19. An apparatus, comprising:
a non-transitory computer readable medium having encoded thereon a set of instructions executable by one or more processors, the set of instructions comprising:
instructions to receive a first plurality of data points, the plurality of data points indicating measurements of a first metric in a computer network and a second metric in the computer network, the plurality of data points including data points for a first device in the computer network and data points for a second device in the computer network;

instructions to calculate, from at least some of the plurality of data points, a measure of volatility of the first metric for the first device;

instructions to calculate, from at least some of the plurality of data points, a measure of volatility of the first metric for the second device;

instructions to calculate, from at least some of the plurality of data points, a measure of volatility of the second metric for the first device;

instructions to calculate, from at least some of the plurality of data points, a measure of volatility of the second metric for the second device;

instructions to apply a first weighting factor to weight the measures of volatility of the first metric for the first device and the second device;

instructions to apply a second weighting factor to weight the measures of volatility of the second metric for the first device and the second device;

instructions to rank the first device and the second device according to the weighted measures of volatility of the first metric and the second metric for the first device and the second device; and instructions to display, for a user, a list of the ranked first device and second device, the list showing the measures of volatility of the first metric and the second metric for each of the first device and the second device.

20. A method, comprising:

receiving, at a computer system a first plurality of data points, the plurality of data points indicating measurements of a first metric in a computer network and a second metric in the computer network, the plurality of data points including data points for a first device in the computer network and data points for a second device in the computer network;

calculating, with the computer system and from at least some of the plurality of data points, a measure of volatility of the first metric for the first device;

instructions to calculate, from at least some of the plurality of data points, a measure of volatility of the first metric for the second device;

calculating, with the computer system and from at least some of the plurality of data points, a measure of volatility of the second metric for the first device;

calculating, with the computer system and from at least some of the plurality of data points, a measure of volatility of the second metric for the second device;

applying, with the computer system, a first weighting factor to weight the measures of volatility of the first metric for the first device and the second device;

applying, with the computer system, a second weighting factor to weight the measures of volatility of the second metric for the first device and the second device;

ranking, with the computer system, the first device and the second device according to the weighted measures of volatility of the first metric and the second metric for the first device and the second device; and displaying, for a user, a list of the ranked first device and second device, the list showing the measures of volatility of the first metric and the second metric for each of the first device and the second device.

* * * * *